US 7,962,861 B2

(12) United States Patent
Erwin et al.

(10) Patent No.: US 7,962,861 B2
(45) Date of Patent: Jun. 14, 2011

(54) CREATING A SENTENCE THAT DESCRIBES A WALK OF A GRAPH

(75) Inventors: Anthony Wayne Erwin, Rochester, MN (US); Brian Owen Wood, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 11/360,354

(22) Filed: Feb. 23, 2006

(65) Prior Publication Data
US 2007/0198247 A1 Aug. 23, 2007

(51) Int. Cl.
G06F 3/00 (2006.01)
G06F 3/048 (2006.01)
(52) U.S. Cl. ........................................ 715/854; 715/855
(58) Field of Classification Search ........... 715/853–855
See application file for complete search history.

(56) References Cited

U.S. PATENT DOCUMENTS

| 5,715,449 A * | 2/1998 | Peters et al. ............................. 1/1 |
| 6,377,287 B1 * | 4/2002 | Hao et al. ........................ 715/853 |
| 2004/0068492 A1 * | 4/2004 | McDade et al. .................. 707/3 |
| 2004/0128275 A1 * | 7/2004 | Moehrle ............................ 707/1 |

* cited by examiner

Primary Examiner — David R Hudspeth
Assistant Examiner — Samuel G Neway
(74) Attorney, Agent, or Firm — Owen J. Gamon

(57) ABSTRACT

In an embodiment, a sentence is created that describes a walk of a graph. The graph includes a set of nodes and a set of edges that are incident to the nodes. The sentence includes label words that describe the nodes and relationship words that describe the edges. The walk is an alternating sequence of a subset of the nodes and of the edges. Each of the edges in the walk is incident to two of the nodes that precede and follow the respective edge. The sentence is created by determining a parent node associated with a selected label word, determining the child nodes of the parent node, determining the edges that are incident to the parent nodes and the child nodes, determining relationship words that describe the edges that are incident to the parent nodes and the child nodes, and determining child label words that describe the child nodes. A selected relationship word and a selected child label word are then added to the sentence. In this way, a walk of the graph may be more easily understood.

9 Claims, 5 Drawing Sheets

CREATING A SENTENCE THAT DESCRIBES A WALK OF A GRAPH

FIELD

An embodiment of the invention generally relates to computers. In particular, an embodiment of the invention generally relates to creating a sentence that represents a walk in a graph.

BACKGROUND

The development of the EDVAC computer system of 1948 is often cited as the beginning of the computer era. Since that time, computer systems have evolved into extremely sophisticated devices, and computer systems may be found in many different settings. One of the most important developments in making computers not only more powerful, but easier to use, was the development of sophisticated user interfaces, such as a Graphical User Interface (GUI). A GUI uses visual representations of common items to allow a user to operate a computer system. In most GUI-based systems, various windows, icons, symbols, menus, etc. are manipulated or activated by a computer user via a pointing device (e.g., a keyboard, mouse, trackball, touchpad, trackpad, or speech recognition device), which allows the user to give instructions to the computer. The movement of the pointing device is usually translated to the movement of an animated arrow or cursor, displayed on the computer screen. By moving the pointing device, the user can position the cursor at various locations on the computer screen. Then, by activating a button on the pointing device, the user can invoke various commands and options on the graphical user interface.

One way that graphical user interfaces are increasingly being used is to display a topological visual model (also called a topology) of inter-related objects. The objects and their relationships are often represented in computer memory via a graph that has nodes and edges. The nodes represent the objects, and the edges represent the relationships. The GUI creates the topological visual model on a display screen by analyzing the nodes and edges.

An object may be any data and/or may represent any entity. In one example, objects may be the various hardware devices, software programs, and data that are connected via a computer network, such as clients, servers, routers, storage devices, applications, and databases. The objects are inter-related, e.g., in that a client is connected to a server, a storage device stores a database, and an application uses a database. The topology typically represents the objects via icons displayed on a display screen and represents the relationships via lines between the icons. For example, servers might be represented in the topology via rectangles whose appearances suggest racks of computer components and labels of server names, and the relationships between the servers might be represented by lines that connect the rectangles.

While this topological visual model can work well for a small number of objects and relationships, as the number of objects and relationships increases, the display screen can quickly become so cluttered with icons and lines that the user experiences difficulty distinguishing them. If the user has a vision impairment, this problem is exacerbated.

Thus, without a better way to represent objects and their inter-relationships, users will continue to experience difficulty in interacting with a topological visual model.

SUMMARY

A method, apparatus, system, and signal-bearing medium are provided. In an embodiment, a sentence is created that describes a walk of a graph. The graph includes a set of nodes and a set of edges that are incident to the nodes. The sentence includes label words that describe the nodes and relationship words that describe the edges. The walk is an alternating sequence of a subset of the nodes and of the edges. Each of the edges in the walk is incident to two of the nodes that precede and follow the respective edge. The sentence is created by determining a parent node associated with a selected label word, determining the child nodes of the parent node, determining the edges that are incident to the parent nodes and the child nodes, determining relationship words that describe the edges that are incident to the parent nodes and the child nodes, and determining child label words that describe the child nodes. A selected relationship word and a selected child label word are then added to the sentence. In this way, a walk of the graph may be more easily understood.

DETAILED DESCRIPTION

In an embodiment, a sentence is created that describes a walk of a graph. The graph includes a set of nodes and a set of edges that are incident to the nodes. The sentence includes label words that describe the nodes and relationship words that describe the edges. The walk is an alternating sequence of a subset of the nodes and the edges. Each of the edges in the alternating sequence is incident to two of the nodes that precede and follow the respective edge in the alternating sequence. The possible label words for the nodes are presented via a user interface. In response to selection of one of the presented label words, the parent node associated with the selected label word is found in the graph. The child nodes of the parent node are then determined, and the child label words that describe the child nodes are presented via the user interface. The relationship words that describe edges that are incident to the parent and child nodes are also determined and presented via the user interface. In response to selection of a label word and a relationship word via the user interface, the selected words are added to the sentence. In this way, a sentence that describes a walk of a graph may be created.

Figure 1:
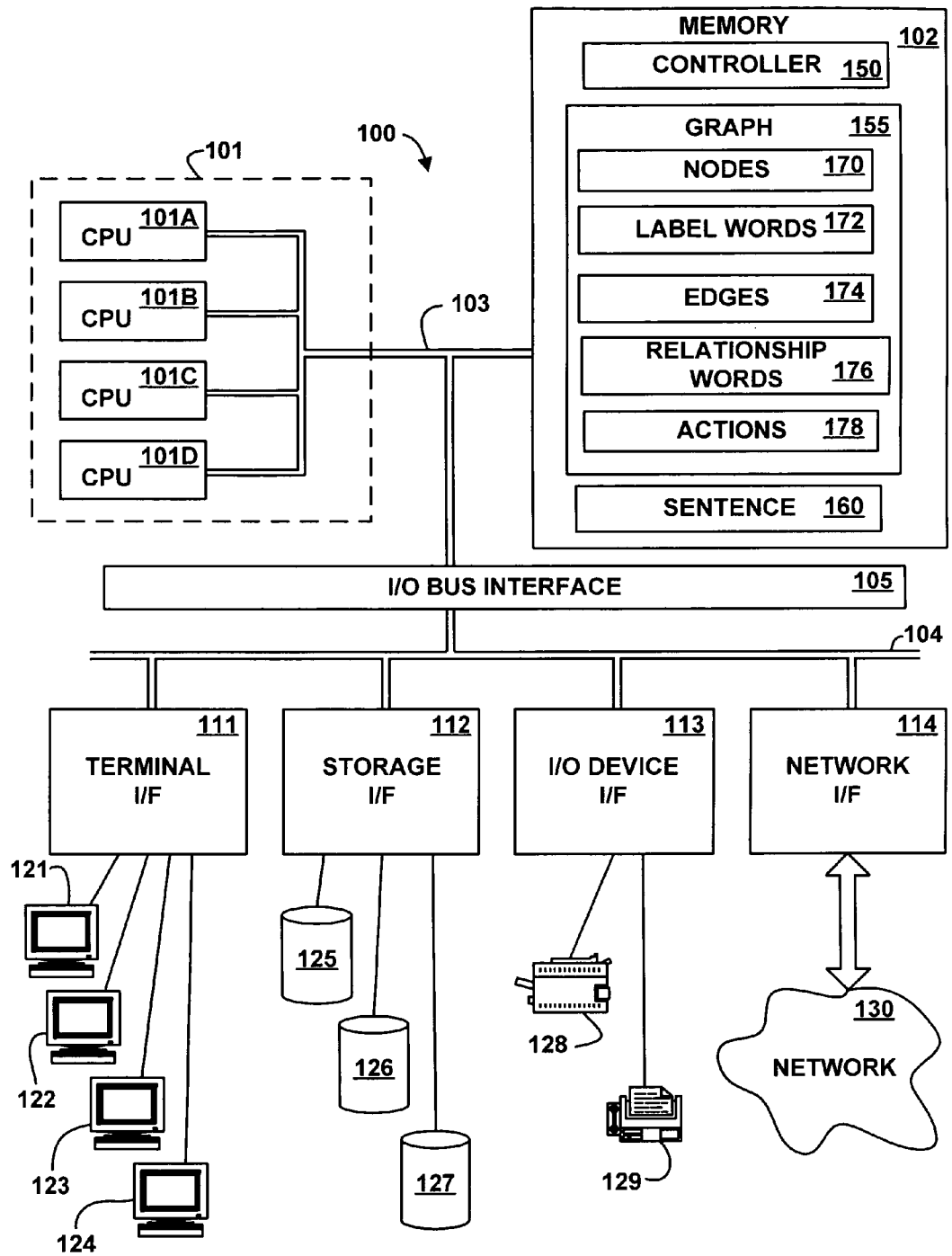
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a controller 150, a graph 155, and a sentence 160. Although the controller 150, the graph 155, and the sentence 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 150, the graph 155, and the sentence 160 are all illustrated as being contained within the memory 102 in the computer system 100, these elements are not necessarily all completely contained in the same storage device at the same time. Further, although the controller 150, the graph 155, and the sentence 160 are illustrated as being separate entities, in other embodiments some of them, portions of some of them, or all of them may be packaged together.

The controller 150 creates the sentence 160 from a selected subset of the graph 155. In an embodiment, the controller 150 includes instructions capable of executing on the processor 101 or statements capable of being interpreted by instructions executing on the processor 101 to perform the functions as further described below with reference to FIG. 5. In another embodiment, the controller 150 may be implemented in microcode. In another embodiment, the controller 150 may be implemented in hardware via logic gates and/or other appropriate hardware techniques in lieu of or in addition to a processor-based system.

The graph 155 includes sets of nodes 170, label words 172, edges 174, relationship words 176, and actions 178. The nodes 170 (also called vertices) include or represent data or objects. The label words 172 describe the nodes 170. The edges 174 may also be called lines, links, or arcs. An edge 174 connects two nodes 170; these two nodes are referred to as incident to that edge, or, equivalently, that edge is incident to those two nodes. The edges 174 may have a direction, in which case the edges 174 are called directed edges. If a direction of an edge 174 is away from a first node and toward a second node, the first node is said to be the parent node of the second node, which is the child node of the first node. The relationship words 176 describe the edges 174. The actions 178 identify functions, operations, methods, procedures, applications, transactions, modules, or any other type of action that may be performed against or using the nodes 170 and/or the edges 174.

The graph 155 may represent any appropriate objects or data. For example, in an embodiment, the organization of a website may be represented by the graph 155, in which case the nodes 170 may represent the web pages available at the web site, and each directed edge 174 represents a link (an embedded address) from one page to another page. As another example, the organization of a computer network (e.g., the network 130) may be represented by the graph 155, in which case the nodes 170 may represent various hardware devices, software programs, and data that are connected via the computer network, such as clients, servers, routers, storage devices, applications, and databases, and each directed edge 174 represents the relationship of the nodes 170, such as where one node contains, hosts, uses, controls, sends data to, or receives data from another node.

The graph 155 may be stored in the memory 102 in any appropriate data structure and may be manipulated via any appropriate algorithm. In various embodiments, the graph 155 may be stored as an incidence list, an adjacency list, an incidence matrix, an adjacency matrix, an admittance matrix, or via any other appropriate storage technique.

In an incidence list, the edges 174 are represented by an array containing pairs (ordered if directed) of the nodes 170 that the edge connects. In an adjacency list, each node 170 has a list of which nodes 170 it is adjacent to. In an incidence matrix, the graph 155 is represented by a matrix of E (edges) by N (nodes), where (edge, node) contains the edge's data, e.g., where data of "1" represents connected and "0" represents unconnected, but in other embodiments any appropriated representation may be used. In an adjacency matrix, the graph 155 is represented by an N by N matrix M, where N is the number of nodes in the graph. If the graph 155 defines an edge from node X to node Y, then the element $M_{x,y}$ is 1, otherwise it is 0, but in other embodiments any appropriate representation may be used.

The graph 155 may be separate from the way it is displayed as a topology representation, which is a visual model of the graph. Example topology representations of the graph 155 are further described below with reference to FIGS. 2, 3, and 4.

One type of the graph 155 is a tree, which represents a hierarchical organization of linked data. A tree takes its name from an analogy to trees in nature, which have a hierarchical organization of branches and leaves. For example, a leaf is connected to a small branch, which further is connected to a large branch, and all branches of the tree have a common starting point at the root. Analogously, in an embodiment where the graph 155 is a tree, the nodes 170 have a hierarchical organization, in that a node has a relationship with another node, which itself may have a further relationship with other nodes, and so on. Thus, all of the nodes 170 can be divided up into sub-groups and groups that ultimately all have a relationship to a root node.

To define a tree more formally, a tree structure defines the hierarchical organization of nodes, which can represent any data. Hence, a tree is a finite set, T, of one or more of the nodes 170, such that a) one specially designated node is called the root of the tree; and b) the remaining nodes (excluding the root) are partitioned into m>=0 disjoint sets $T_1, \ldots T_m$, and each of these sets is in turn a tree.

The trees $T_1, \ldots, T_m$ are called the subtrees of the root. Thus, every node in a tree is the root of some subtree contained in the whole tree. The number of subtrees of a node is called the degree of that node. A node of degree zero is called a terminal node or a leaf. A non-terminal node is called a branch node. The level of a node with respect to T is defined by saying that the root has level 0, and other nodes have a level that is one higher than they have with respect to the subtree that contains them. Each root is the parent of the roots of its subtrees, and the latter are siblings, and they are also the children of their parent. The nodes in the subtrees of a root are the root's descendants. The root of the entire tree has no parent.

A different definition of a tree defines a tree as a connected acyclic simple graph. A simple graph has no multiple edges 174 that share the same end nodes. An acyclic graph contains no cycles, where a cycle is a closed walk.

A walk is an alternating sequence of a subset of the nodes 170 and edges 174 of the graph 155, beginning with a first-node and ending with a last-node, in which each node 170 in the walk is incident to the two edges 174 that precede and follow it in the sequence, and the nodes 170 that precede and follow an edge 174 are the end-nodes of that edge. The walk is said to be closed if its first-node and last-node are the same or open if its first-node and last-node are different. An open walk is also called a path. In various embodiments, all of the edges 174 in the walk may be different or distinct (in which case the walk is also known as a trail), or some of the edges 174 in the walk may be the same. A walk may be formed from any type of the graph 155. A walk is further described below with reference to FIGS. 3 and 4.

The sentence 160 represents a walk of all or only a selected subset of the graph 155. The sentence 160 includes an alternating sequence of some or all of the label words 172 and the relationship words 176. The sentence 160 is further described below with reference to FIGS. 2, 3, and 4.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127, which are typically rotating magnetic disk drive storage devices, although they could alternatively be other devices, including arrays of disk drives configured to appear as a single large storage device to a host. The contents of the DASD 125, 126, and 127 may be loaded from and stored to the memory 102 as needed. The storage interface unit 112 may also support other types of devices, such as a diskette device, a tape device, an optical device, or any other type of storage device.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
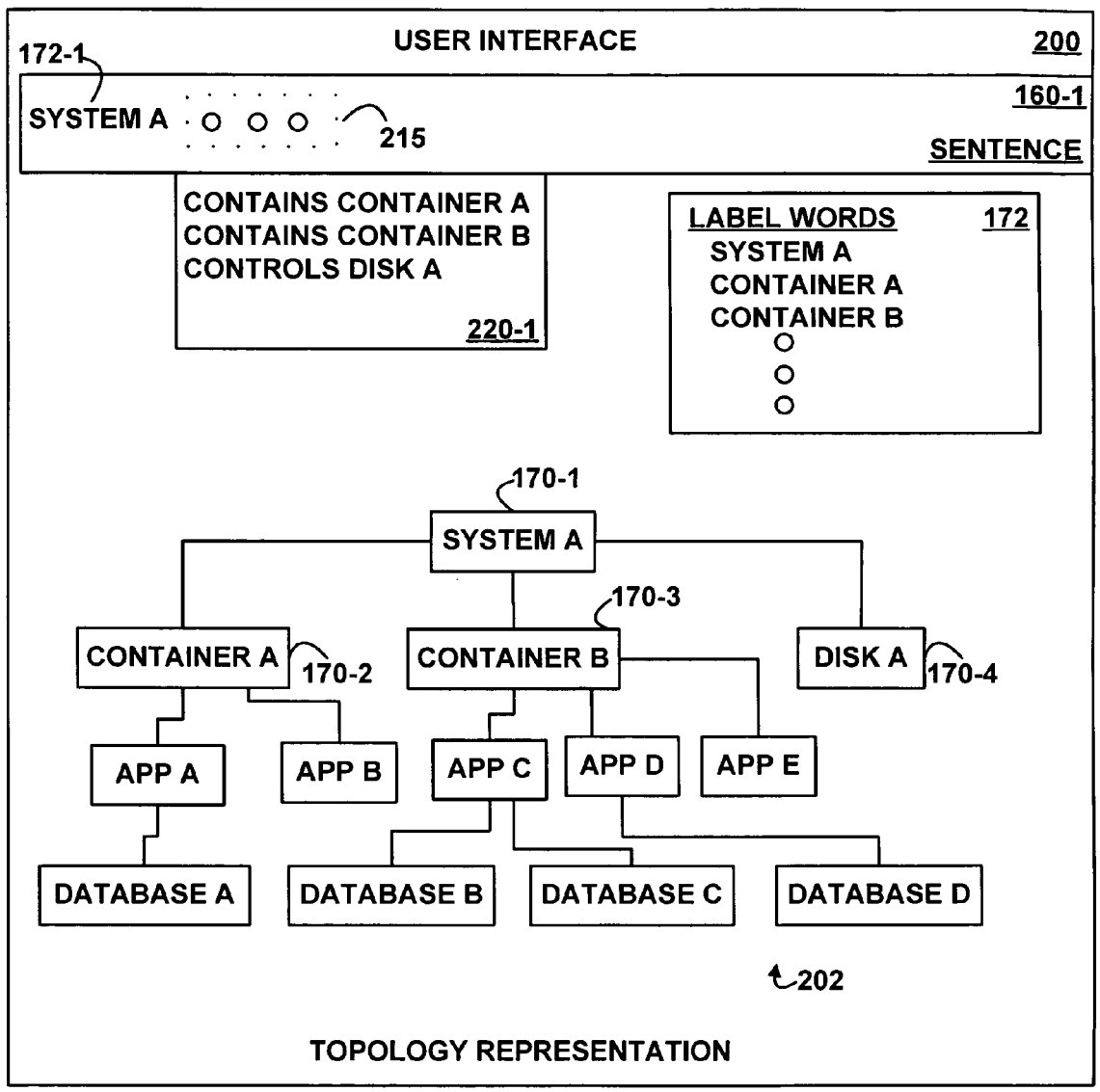
FIG. 2 depicts a block diagram of an example user interface for creating a sentence that describes a walk of a graph, according to an embodiment of the invention.
Figure 3:
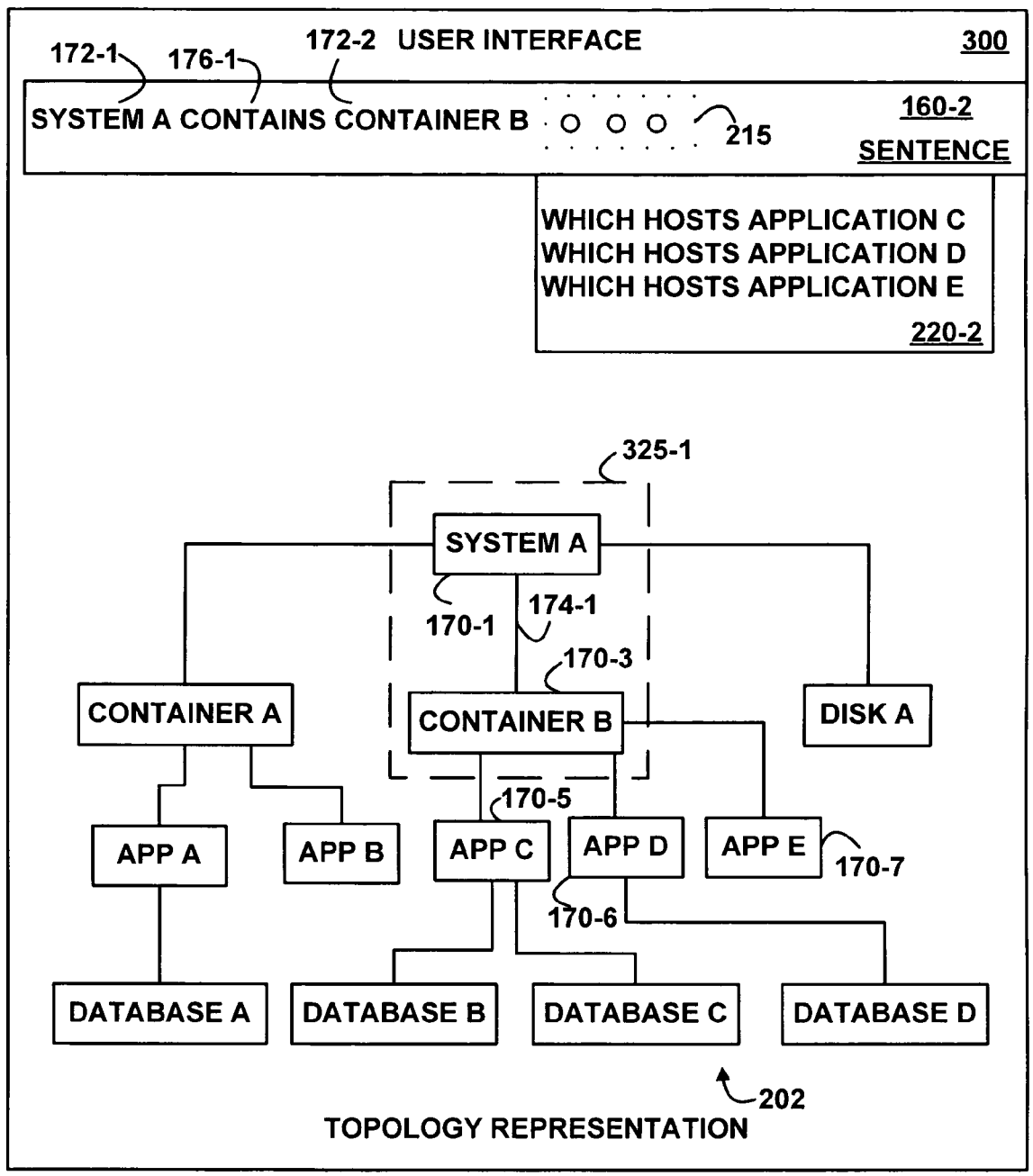
FIG. 3 depicts a block diagram of a further example user interface for creating a sentence that describes a walk of a graph, according to an embodiment of the invention.
Figure 4:
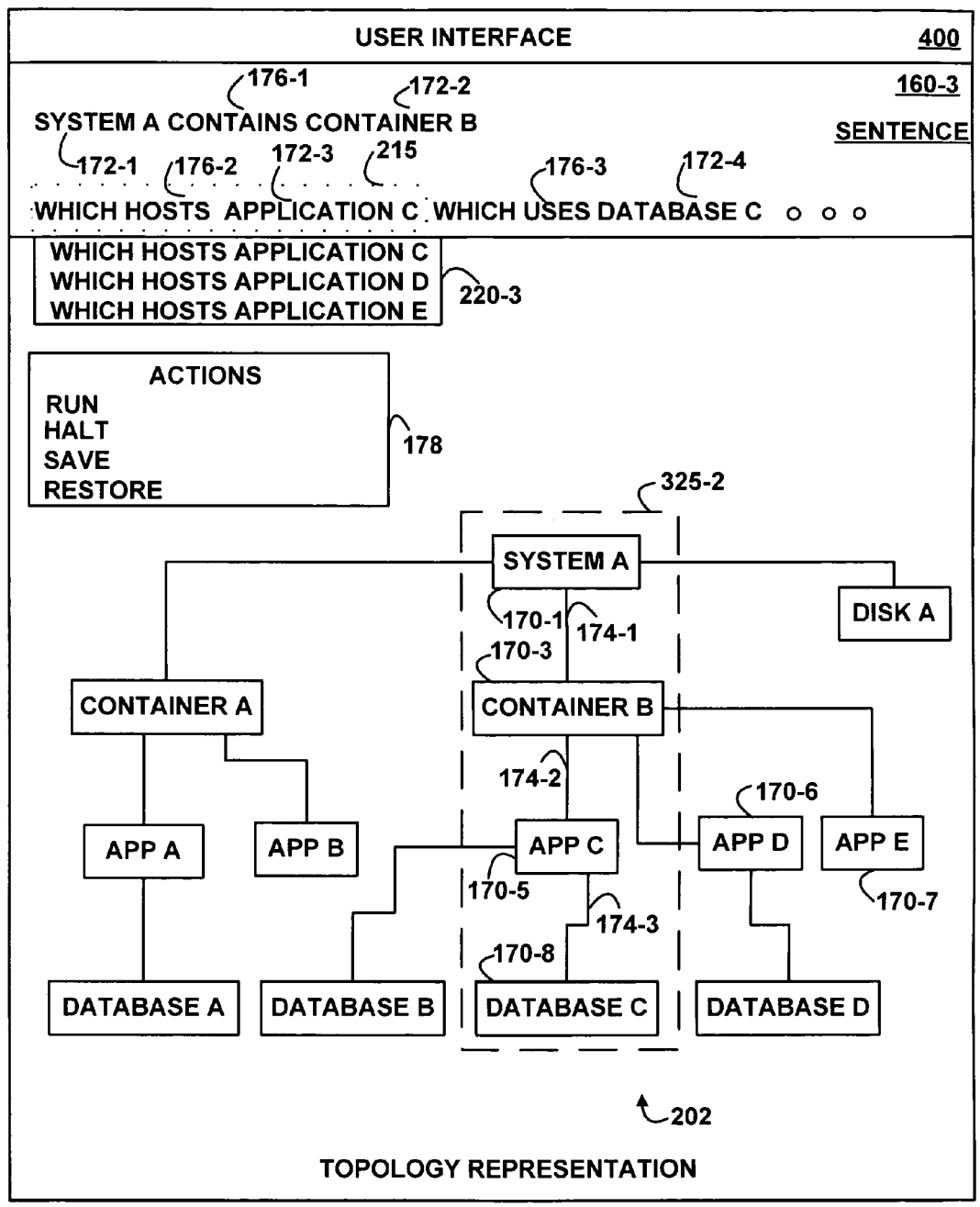
FIG. 4 depicts a block diagram of a further example user interface for creating a sentence that describes a walk of a graph, according to an embodiment of the invention.

FIGS. 2, 3, and 4 describe example user interfaces for creating and/or modifying the sentence 160. The user interfaces of FIGS. 2, 3, and 4 may be presented, e.g., on the display terminals 121, 122, 123, 124, utilizing text-to-speech technology via a speaker, or via any other appropriate technique.

FIG. 2 depicts a block diagram of an example user interface 200 for creating the sentence 160-1 (FIG. 1) that describes a walk of the graph 155 (FIG. 1), according to an embodiment of the invention. The user interface 200 includes an example topology representation 202 of the graph 155 (FIG. 1). The topology representation 202 includes the example nodes 170-1, 170-2, 170-3, and 170-4, which graphically represent the nodes 170 of the graph 155. Although the topology representation 202 in FIG. 2 illustrates a graph that is a tree, other embodiments are not restricted to trees, and the graph 170 may be of any type, as previously described above with reference to FIG. 1.

The user interface 200 further includes a sentence 160-1, which is an example of the sentence 160 (FIG. 1). The sentence 160-1 includes a label word 172-1, which is an example of the label words 172 (FIG. 1). The label word 172-1 describes the node 170-1. The sentence 160-1 further includes an icon 215, which indicates a current insertion point in the sentence 160-1, at which the next relationship word 176 and label word 172 will be added. The icon 215 may be moved to any point in the sentence 160-1.

The user interface 200 further includes a list of label words 172, which represents the label words for all of the nodes 170 in the graph 155. The controller 150 adds a label word from the list to the sentence 160-1 if selected by a user.

The user interface 200 further includes a list 220-1 of relationship words 176 (e.g., "contains," "contains," and "controls") that describes the edges 174 between the parent node 170-1 and its child nodes 170-2, 170-3, and 170-4. The list 220-1 further includes label words (e.g., "container A," "container B," "disk A") that describe the child nodes 170-2, 170-3, and 170-4 of the parent node 170-1. The node 170-1 is the parent node because the icon 215 follows the label word 172-1 in the sentence 160-1; thus, the node 170-1, which is associated with the label word 172-1, is the parent node of the nodes that are described by the label words in the list 220-1. The user may select from the list 220-1 the next relationship word 176 and label word 172 to be added to the sentence 160-1 at the insertion point indicated by the icon 215. If "contains container B" is selected from the list 220-1, then the controller 150 adds the relationship word "contains" and the label word "container B" to the sentence 160 at the insertion point indicated by the icon 215, which results in the sentence and user interface as further described below with reference to FIG. 3.

FIG. 3 depicts a block diagram of an example user interface 300 for creating a sentence that describes a walk 325-1 of the graph 155 (FIG. 1), according to an embodiment of the invention. The user interface 300 includes a topology representation 202 of the graph 155 (FIG. 1). The topology representation 202 includes the example nodes 170-1, 170-3, 170-5, 170-6, and 170-7, which graphically represent the nodes 170 of the graph 155.

The user interface 300 further includes a sentence 160-2, which is an example of the sentence 160 (FIG. 1). The sentence 160-2 describes the walk 325-1. The walk 325-1 includes the nodes 170-1 and 170-3, and the edge 174-1, which is incident to the nodes 170-1 and 170-3. The sentence 160-2 includes the label words 172-1 and 172-2, which are examples of the label words 172 (FIG. 1). The sentence 160-2 further includes a relationship word 176-1, which is an example of the relationship word 176 (FIG. 1).

The label word 172-1 describes the node 170-1, and the label word 172-2 describes the node 170-3. The relationship word 176-1 describes the edge 174-1. The sentence 160-2 further includes the icon 215, which indicates the current insertion point in the sentence 160-2, at which the next relationship word 176 and label word 172 will be added. The icon 215 may be moved to any point in the sentence 160-2.

The user interface 300 further includes a list 220-2 of relationship words that describes the edges 174 between the parent node 170-3 and its child nodes 170-5, 170-6, and 170-7. The list 220-2 further includes label words that describe the child nodes 170-5, 170-6, and 170-7 of the parent node 170-3. The node 170-3 is the parent node associated with the list 220-2 because the icon 215 follows the label word 172-2 in the sentence 160-2; thus, the node 170-3, which is described by the label word 172-2, is the parent node of the child nodes that are described by the label words in the list 220-2. The user may select, from the list 220-2, the next relationship word 176 and label word 172 to be added to the sentence 160-2 at the insertion point indicated by the icon 215 in the sentence 160-2.

FIG. 4 depicts a block diagram of an example user interface 400 for creating a sentence that describes a walk 325-2 of the graph 155 (FIG. 1), according to an embodiment of the invention. The user interface 400 includes a topology representation 202 of the graph 155 (FIG. 1). The topology representation 202 includes the example nodes 170-1, 170-3, 170-5, 170-8, and 170-9, which graphically represent the nodes 170 of the graph 155.

The user interface 400 further includes a sentence 160-3, which is an example of the sentence 160 (FIG. 1). The sentence 160-3 describes the walk 325-2. The walk 325-2 includes the nodes 170-1, 170-3, 170-5, 170-6, and 170-7. The walk 325-2 further includes the edge 174-1, which is incident to the nodes 170-1 and 170-3, the edge 174-2, which is incident to the nodes 170-3 and 170-5, and the edge 174-3, which is incident to the nodes 170-5 and 170-8. The sentence 160-3 includes label words 172-1, 172-2, 172-3, and 172-4, which are examples of the label words 172 (FIG. 1). The sentence 160-2 further includes relationship words 176-1, 176-2, and 176-3, which are examples of the relationship word 176 (FIG. 1).

The label word 172-1 describes the node 170-1, the label word 172-2 describes the node 170-3, the label word 172-3 describes the node 170-5, and the label word 172-4 describes the node 170-8. The relationship word 176-1 describes the edge 174-1, the relationship word 176-2 describes the edge 174-2, and the relationship word 176-3 describes the edge 174-3. The sentence 160-2 further includes the icon 215, which indicates the current insertion point in the sentence 160-2, at which the next relationship word 176 and label word 172 will be added. The icon 215 may be moved to any point in the sentence 160-2.

The user interface 400 further includes a list 220-3 of relationship words that describes the edges 174 between the parent node 170-3 and its child nodes 170-5, 170-6, and 170-7. The list 220-3 further includes label words that describe the child nodes 170-5, 170-6, and 170-7 of the parent node 170-3. The node 170-3 is the parent node associated with the list 220-3 because the icon 215 follows the label word 172-2 in the sentence 160-3; thus, the node 170-3, which is described by the label word 172-2, is the parent node of the child nodes that are described by the label words in the list 220-3. The user may select, from the list 220-3, the next relationship word 176 and label word 172 to be added to the sentence 160-3 at the insertion point indicated by the icon 215.

The user interface 400 further includes a display of the actions 178 that are available to be performed. The controller 150 performs a selected action against or using a selected node and/or edge.

FIG. 4 illustrates that the icon 215 need not be placed at the end of the sentence. In fact, the icon 215 may be moved to any insertion point within the sentence 160-3, and selection of a relationship word and label word from the list 220-3 causes the controller 150 to change the sentence 160-3 to represent a different walk of the graph. For example, if the user selects "which hosts application D" from the list 220-3, then the controller 150 changes the sentence 160-3 to: "system A contains container B which hosts application C" which changes the walk of the sentence to represent nodes 170-1, 170-3, and 170-6.

Figure 5:
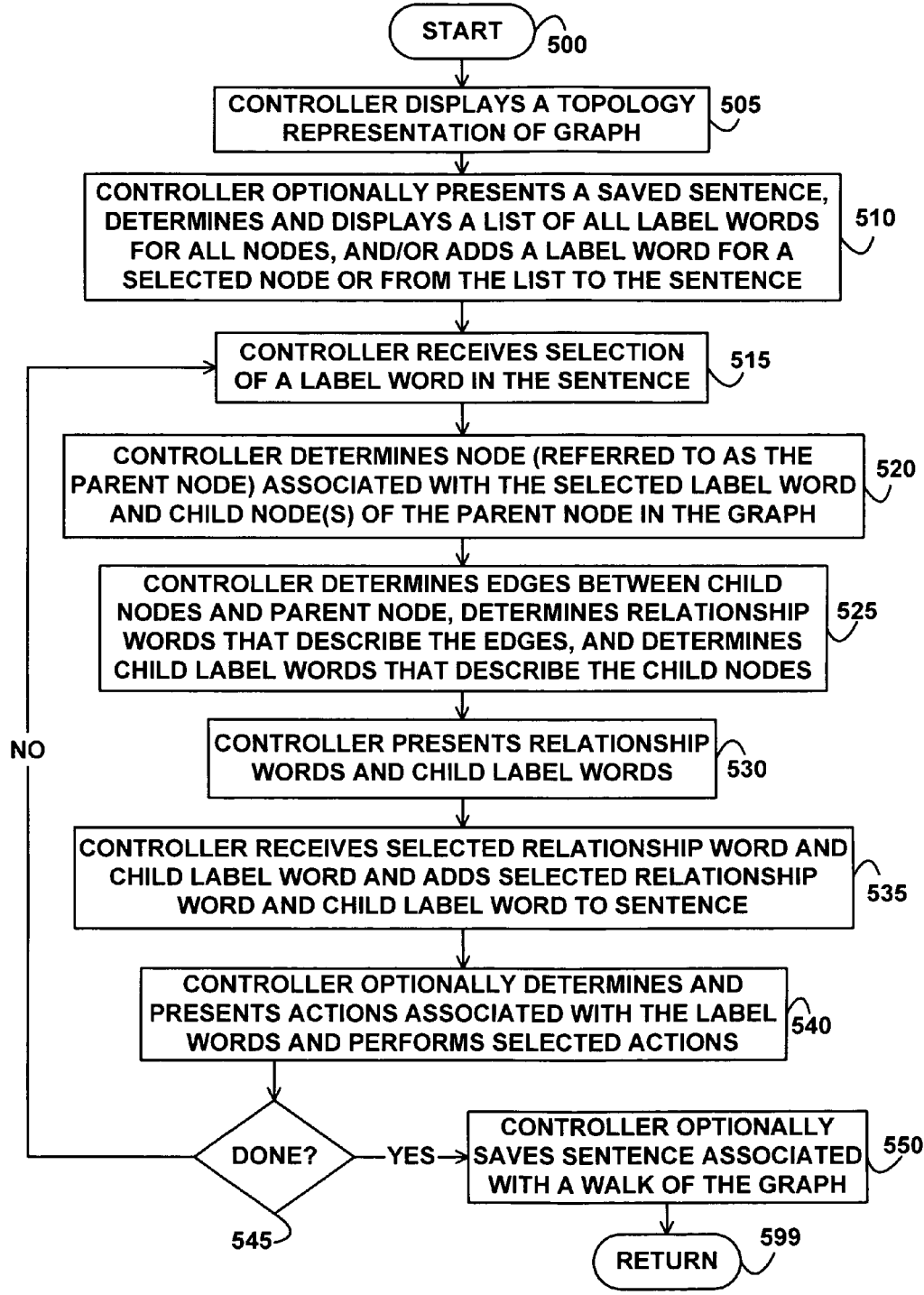
FIG. 5 depicts a flowchart of processing for creating a sentence that describes a walk of a graph, according to an embodiment of the invention.

FIG. 5 depicts a flowchart of processing for creating the sentence 160 that describes a walk of a graph, according to an embodiment of the invention. Control begins at block 500. Control then continues to block 505 where the controller 150 displays the topology representation 202 of the graph 155. Control then continues to block 510 where the controller 150 optionally presents a saved sentence 160, determines and displays a list all of the label words 172 for all of the nodes 170, or adds a label word for a selected node or from the list to the sentence 160.

Control then continues to block 515 where the controller 150 receives selection of a label word 172 in the sentence 160. A label word in the sentence 160 may be selected via operation of a user interface, such as by selecting a word or moving the icon 215 to an insertion point following the word via a mouse, keyboard, or other pointing device. In another embodiment, a label word in the sentence 160 may be selected programmatically, or via any other appropriate technique.

Control then continues to block 520 where the controller 150 determines the node associated with the selected label word. The determined node is denominated the "parent node" for the purposes of FIG. 5. The controller 150 further determines the child node or nodes of the parent node in the graph 155.

Control then continues to block 525 where the controller 150 determines the edges that are incident to the parent nodes and the child nodes, e.g., by determining the directed edge or edges whose direction is away from the parent nodes or via any other appropriate technique. The controller 150 then determines the relationship words that describe the edges that are incident to the parent nodes and the child nodes and determines child label words that describe the child nodes.

Control then continues to block 530 where the controller 150 presents a list (e.g., the list 220-1, 220-2, or 220-3) of the child label words and the relationship words that describe the edges 174 that are incident to the parent node (associated with the selected label word) and the child nodes of that parent node. For example, in FIG. 2, the selected label word is the label word 172-1, the parent node associated with the selected label word 172-1 is the node 170-1, the child nodes of the parent node are the nodes 170-2, 170-3, and 170-4. Further, in FIG. 2, the list 220-1 includes relationship words that describe the edges between the nodes 170-1 and 170-2 ("contains"), between the nodes 170-1 and 170-3 ("contains"), and between the nodes 170-1 and 170-4 ("controls"). Further, in FIG. 2, the list 220-1 includes child label words that describe the child nodes: "container A" for the child node 170-2, "container B" for the child node 170-3, and "disk A" for the child node 170-4.

As another example, in FIGS. 3 and 4, the selected label word is the label word 172-2, the parent node associated with the selected label word 172-1 is the node 170-3, the child nodes of the parent node are the nodes 170-5, 170-6, and 170-7. Further, in FIGS. 3 and 4, the lists 220-2 and 220-3 include relationship words that describe the edges between nodes 170-3 and 170-5 ("hosts"), between nodes the 170-3 and 170-6 ("hosts"), and between the nodes 170-3 and 170-7 ("hosts"). Further, in FIGS. 3 and 4, the list 220-2 includes child label words that describe the child nodes: "application C" for the child node 170-5, "application D" for the child node 170-6, and "application E" for the child node 170-7.

Control then continues to block 535 where the controller 150 receives a selected relationship word and child label word from the user interface (e.g., from the user interface 200, 300, or 400) and adds the selected relationship word and the selected child label word to the sentence 160. For example, in response to selection of "contains container B" from the list 220-1 in FIG. 2, the controller 150 adds the relationship word 176-1 and the label word 172-2 to the sentence 160-2, as illustrated in FIG. 3.

Control then continues to block 540 where the controller 150 determines and presents the actions 178 (FIG. 4) associated with a label word or words in the sentence 160 and performs a selected actions or actions.

Control then continues to block 545 where the controller 150 determines whether the user is done creating or modifying the sentence 160. If the determination at block 545 is false, then the creation or modification of the sentence 160 is not done, so control returns to block 515 where the controller 150 receives selection of another label word in the sentence 160, as previously described above. If the determination at block 545 is true, then the creation or modification of the sentence 160 is done, so control continues to block 550 where the controller 150 optionally saves the sentence 160 associated with a walk of the graph 155. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    creating, using a computer, a sentence comprising a plurality of label words and at least one relationship word, wherein the sentence describes a walk of a graph, wherein the graph is stored in semiconductor memory and comprises a set of nodes and a set of edges, wherein the edges are incident to the nodes, wherein the label words describe the nodes, wherein the relationship words describe the edges; wherein the walk comprises an alternating sequence of a subset of the nodes and of the edges, and wherein each of the edges in the alternating sequence is incident to two of the nodes that precede and follow the respective edge in the alternating sequence, wherein the alternating sequence begins with a first-node and ends with a last-node,
    wherein the creating further comprises:
        determining a parent node associated with a selected label word;
        determining child nodes of the parent node that is associated with the selected label word;
        determining the edges that are incident to the parent nodes and the child nodes;
        determining the relationship words that describe the edges that are incident to the parent nodes and the child nodes;
        determining child label words that describe the child nodes;
        presenting the child label words and the relationship words that describe the edges that are incident to the parent node and the child nodes; and
        adding a selected relationship word and a selected child label word to the selected label word to form the sentence; and
    presenting the sentence via a display.

2. The method of claim 1, wherein the walk comprises an alternating sequence of a subset of the nodes and of the edges, and wherein each of the edges in the alternating sequence is incident to two of the nodes that precede and follow the respective edge in the alternating sequence.

3. The method of claim 2, wherein the alternating sequence begins with a first-node and ends with a last-node.

4. The method of claim 1, wherein the label words describe the nodes.

5. The method of claim 1, further comprising:
    determining actions associated with the label words; and
    performing a selected one of the actions.

6. A non-transitory signal-bearing medium encoded with instructions, wherein the instructions when executed comprise:
    creating a sentence comprising a plurality of label words and a plurality of relationship words, wherein the sentence describes a walk of a graph, wherein the graph is stored in semiconductor memory and comprises a set of nodes and a set of edges, wherein the edges are incident to the nodes, wherein the label words describe the nodes, wherein the relationship words describe the edges;

wherein the walk comprises an alternating sequence of a subset of the nodes and of the edges, and wherein each of the edges in the alternating sequence is incident to two of the nodes that precede and follow the respective edge in the alternating sequence, wherein the alternating sequence begins with a first-node and ends with a last-node, wherein the creating further comprises:
- determining a parent node associated with a selected label word;
- determining child nodes of the parent node that is associated with the selected label word;
- determining the edges that are incident to the parent nodes and the child nodes;
- determining the relationship words that describe the edges that are incident to the parent nodes and the child nodes;
- determining child label words that describe the child nodes;
- presenting the child label words and the relationship words that describe the edges that are incident to the parent node and the child nodes; and
- adding a selected relationship word and a selected child label word to selected label word to form the sentence; and
- presenting the sentence.

7. The non-transitory signal-bearing medium of claim 6, further comprising:
- determining actions associated with the label words; and
- performing a selected one of the actions.

8. A method for configuring a computer, comprising:
- configuring the computer to create a sentence comprising a plurality of label words and a plurality of relationship words, wherein the sentence describes a walk of a graph, wherein the graph comprises a set of nodes and a set of edges, wherein the edges are incident to the nodes, wherein the label words describe the nodes, wherein the relationship words describe the edges; wherein the walk comprises an alternating sequence of a subset of the nodes and of the edges, and wherein each of the edges in the alternating sequence is incident to two of the nodes that precede and follow the respective edge in the alternating sequence, and wherein the alternating sequence begins with a first-node and ends with a last-node, wherein the configuring the computer to create further comprises:
- configuring the computer to determine a parent node associated with a selected label word;
- configuring the computer to determine child nodes of the parent node that is associated with the selected label word;
- configuring the computer to determine the edges that are incident to the parent nodes and the child nodes;
- configuring the computer to determine relationship words that describe the edges that are incident to the parent nodes and the child nodes;
- configuring the computer to determine child label words that describe the child nodes;
- configuring the computer to present the child label words and the relationship words that describe the edges that are incident to the parent node and the child nodes; and
- configuring the computer to add a selected relationship word and a selected child label word to the selected label word to form the sentence; and configuring the computer to present the sentence.

9. The method of claim 8, further comprising:
- configuring the computer to determine actions associated with the label words; and
- performing a selected one of the actions.

* * * * *